US012352428B2

(12) United States Patent
Michael Krijn et al.

(10) Patent No.: US 12,352,428 B2
(45) Date of Patent: Jul. 8, 2025

(54) LUMINOUS LIGHTING PANEL SYSTEM

(71) Applicant: SIGNIFY HOLDING B.V., Eindhoven (NL)

(72) Inventors: Marcellinus Petrus Carolus Michael Krijn, Eindhoven (NL); Bartel Marinus Van De Sluis, Eindhoven (NL); Anna Wilhelmina Maria De Best, Veldhoven (NL); Leendert Teunis Rozendaal, Valkenswaard (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/838,014

(22) PCT Filed: Feb. 27, 2023

(86) PCT No.: PCT/EP2023/054791
§ 371 (c)(1),
(2) Date: Aug. 13, 2024

(87) PCT Pub. No.: WO2023/165920
PCT Pub. Date: Sep. 7, 2023

(65) Prior Publication Data

US 2025/0146647 A1 May 8, 2025

(30) Foreign Application Priority Data

Mar. 3, 2022 (EP) .................................... 22159935

(51) Int. Cl.
*F21V 7/00* (2006.01)
*F21V 5/00* (2018.01)
(Continued)

(52) U.S. Cl.
CPC ............ *F21V 7/0083* (2013.01); *F21V 5/007* (2013.01); *F21V 7/05* (2013.01); *F21V 11/14* (2013.01);
(Continued)

(58) Field of Classification Search
CPC ........ F21V 11/14; F21V 7/0083; F21V 5/007; F21V 7/05
See application file for complete search history.

(56) References Cited

U.S. PATENT DOCUMENTS

2014/0299408 A1* 10/2014 Swinkels .............. G10K 11/16 181/289
2015/0300597 A1 10/2015 Baaijens et al.
(Continued)

FOREIGN PATENT DOCUMENTS

CN 210398485 U 4/2020
DE 102020104340 A1 8/2021
(Continued)

*Primary Examiner* — Tracie Y Green
*Assistant Examiner* — Michael Chiang

(57) ABSTRACT

A lighting panel system (1, 100) comprising a luminous panel (2) comprising an array of LED nodes (3), each LED node of the array of LED nodes (3) comprising one or more LEDs (4), each of the one or more LEDs (4) comprising a light exit surface (5) and being configured to, in operation, emit light (15, 16), one or more first subsets (6) of the array of LED nodes (3) being spotlight nodes comprising collimating secondary optics (8), and one or more second subsets (7) of the array of LED nodes (3) being regular LED nodes not comprising collimating secondary optics, and a grid structure (9) arranged such that the light (15, 16) emitted by the LEDs (4) of the array of LED nodes (3) traverses the grid structure (9). The grid structure (9) comprises at least one diffusely reflecting surface (10), the grid structure (9) is constructed such as to allow one or more pre-defined beam angles of light (15) emitted by the LEDs (4) of the spotlight
(Continued)

nodes to pass without being reflected by the grid structure (9), and the grid structure (9) is configured and arranged to hide the collimating secondary optics (8) of the spotlight nodes when seen from the point of view of a viewer (11) looking at the lighting panel system (1, 100).

14 Claims, 5 Drawing Sheets

(51) Int. Cl.

| | |
|---|---|
| ***F21V 7/05*** | (2006.01) |
| ***F21V 11/14*** | (2006.01) |
| ***F21V 23/04*** | (2006.01) |
| ***G10K 11/16*** | (2006.01) |
| *F21Y 105/16* | (2016.01) |
| *F21Y 115/10* | (2016.01) |

(52) U.S. Cl.
CPC .......... *F21V 23/0478* (2013.01); *G10K 11/16* (2013.01); *F21Y 2105/16* (2016.08); *F21Y 2115/10* (2016.08)

(56) References Cited

U.S. PATENT DOCUMENTS

| | | | | |
|---|---|---|---|---|
| 2015/0316231 | A1 | 11/2015 | Di Trapani | |
| 2015/0377425 | A1* | 12/2015 | Van Bommel | F21K 9/60 362/293 |
| 2016/0018063 | A1 | 1/2016 | Skergeth et al. | |
| 2016/0033105 | A1 | 2/2016 | Odnoblyudov | |
| 2016/0273723 | A1 | 9/2016 | Van Gheluwe et al. | |
| 2019/0032891 | A1* | 1/2019 | Dijken | F21V 11/14 |
| 2019/0041035 | A1* | 2/2019 | Dijken | F21V 11/14 |
| 2019/0107660 | A1* | 4/2019 | Franck | F21V 11/06 |
| 2020/0278089 | A1* | 9/2020 | Van Eeuwijk | F21V 3/063 |

FOREIGN PATENT DOCUMENTS

| | | | |
|---|---|---|---|
| JP | 2013143250 | A | 7/2013 |
| JP | 5732157 | B1 | 6/2015 |
| WO | 2013057610 | A1 | 4/2013 |

* cited by examiner

LUMINOUS LIGHTING PANEL SYSTEM

CROSS-REFERENCE TO PRIOR APPLICATIONS

This application is the U.S. National Phase application under 35 U.S.C. § 371 of International Application No. PCT/EP2023/054791, filed on Feb. 27, 2023, which claims the benefit of European Patent Application No. 22159935.0, filed on Mar. 3, 2022. These applications are hereby incorporated by reference herein.

FIELD OF THE INVENTION

The invention relates to a lighting panel system comprising a luminous panel comprising an array of LED nodes, each LED node of the array of LED nodes comprising one or more LEDs, each of the one or more LEDs comprising a light exit surface and being configured to, in operation, emit light, one or more first subsets of the array of LED nodes being spotlight nodes comprising collimating secondary optics and one or more second subsets of the array of LED nodes being regular LED nodes not comprising collimating secondary optics.

BACKGROUND OF THE INVENTION

Luminous lighting panels find application in several domains, such as in workplace environments, where they bring a room to life and contribute to a feeling of well-being. They offer a good solution to turn plain workplaces into dynamic spaces that people actually want to work in. They can display static as well as dynamic patterns, creating a relaxing environment or subtly influencing behavior (such as encouraging workers to be more active). They can be wall-mounted, or ceiling mounted.

A ceiling mounted panel bypasses the constraints of conventional ceiling design and allows for an uncluttered minimalistic appearance with a thin edge and invisible light sources. It provides daylight-like illumination spread evenly across the panel surface. Next to this, it enhances room acoustics by using sound-absorbing materials. It allows discrete integration with the ceiling architecture and building management system.

US 2016/0018063 A1 discloses an LED lighting module having a plurality of first LEDs for generating a first light, a first optical element for influencing the first light, wherein the first optical element is designed to influence the first light such that it is emitted in a concentrated manner by the LED lighting module in a direction, at least one second LED for generating a second light and a second optical element for influencing the second light. The second optical element is designed to influence the second light such that it is emitted diffusely by the LED lighting module in the direction. The second optical element is, where provided, inlaid in the first optical element.

However, in luminous panels, combining diffuse (wide beam) illumination with directional (spotlight) illumination is not yet possible without affecting the uniform appearance and minimalistic properties of the luminous panel.

WO 2013/057610 discloses an optical acoustic panel for absorbing sound and providing a daylight appearance. The optical acoustic panel comprises a first side, a second side, a micro perforated foil and a spacing structure. The first side receives sound. The second side is opposite the first side and receives light. The micro perforated foil comprises sub-millimeter holes, is light transmitting and is arranged at the first side. The sub-millimeter holes are entrance holes of a cavity. The spacing structure spaces the first side at a predefined distance from the second side. The spacing structure comprises a plurality of light transmitting cells. The light transmitting cells comprise a light transmitting channel, a light exit window, a light input window and a wall. The light transmitting channel collimates a part of the light received at the second side of the optical acoustic panel. The light transmitting channels extend from the first side towards the second side and are filled with air. The light input window is arranged at the second side. At least a part of the light exit window being arranged at the first side. The wall is interposed between the light input window and the part of the light exit window. The wall encloses the light transmitting channel. At least a part of the wall being reflective or transmissive in a predefined spectral range for obtaining a blue light emission at relatively large light emission angles with respect to a normal to the first side.

SUMMARY OF THE INVENTION

It is an object of the present invention to overcome this problem, and to provide a lighting panel system comprising a luminous panel with which it becomes possible to combine diffuse (wide beam) illumination with directional (spotlight) illumination with little or even no effect on the uniform appearance and minimalistic properties of the luminous panel and the lighting panel system.

According to a first aspect of the invention, this and other objects are achieved by a lighting panel system comprising a luminous panel comprising an array of LED nodes, each LED node of the array of LED nodes comprising one or more LEDs, each of the one or more LEDs comprising a light exit surface and being configured to, in operation, emit light, one or more first subsets of the array of LED nodes being spotlight nodes comprising collimating secondary optics, and one or more second subsets of the array of LED nodes being regular LED nodes not comprising collimating secondary optics, and a grid structure arranged such that the light emitted by the LEDs of the array of LED nodes traverses the grid structure, where the grid structure comprises at least one of a diffusely reflecting and a diffusely transmissive surface part, the grid structure is constructed such as to allow one or more pre-defined beam angles of light emitted by the LEDs of the spotlight nodes to pass without being reflected by the grid structure, and the grid structure is configured and arranged to hide the secondary optics of the spotlight nodes when seen from the point of view of a viewer looking at the lighting panel system.

Thereby, and in particular by providing a grid structure arranged such that the light emitted by the LEDs of the array of LED nodes traverses the grid structure, where the grid structure comprises at least one diffusely reflecting surface, the grid structure is constructed such as to allow one or more pre-defined beam angles of light emitted by the LEDs of the spotlight nodes to pass without being reflected by the grid structure, and the grid structure is configured and arranged to hide the secondary optics of the spotlight nodes when seen from the point of view of a viewer looking at the lighting panel system, a lighting panel system is provided with which it becomes possible to combine diffuse (wide beam) illumination with directional (spotlight) illumination with little or even no effect on the uniform appearance and minimalistic properties of the luminous panel and the lighting panel system.

In an embodiment, the grid structure is a linear grid comprising a plurality of grid elements, and the plurality of grid elements are aligned along a direction being any one of not parallel with and perpendicular to the light exit surface of each LED of the array of LED nodes.

Such a grid structure is very simple and is thus straight forward and cost-effective to produce.

In an embodiment, the grid structure is a 2D grid.

A 2D grid structure provides the advantage that a viewer looking towards the lighting panel will see a predominantly evenly lit grid surface and will thus experience a minimum of otherwise discomforting glare.

In an embodiment, the 2D grid is a square grid.

In an embodiment, the 2D grid is a rectangular grid.

In an embodiment, the 2D grid is a hexagonal grid.

In an embodiment, the 2D grid is a quasi-random grid.

Such 2D grid structures are particularly simple and are thus straight forward and cost-effective to produce.

In an embodiment, the layout of the grid structure is chosen in dependence of one or more of at least one anticipated prevailing viewer position and at least one anticipated prevailing direction of view relative to the array of LED nodes.

Thereby, a grid structure is provided which is optimized with a view to providing the best and most comfortable viewing experience in that or those direction(s) that are predominantly used by viewers.

In an embodiment, the plurality of grid elements are aligned to be mutually parallel.

Such a grid structure is particularly simple and is thus straight forward and cost-effective to produce.

In an embodiment, the plurality of grid elements are aligned to gradually change orientation along a longitudinal direction L of the grid structure.

Thereby a lighting panel system is provided which may support different spotlight nodes with different beam directions. Such a lighting panel system is advantageous when desiring to obtain a homogeneous soft illumination of several objects located in different positions from the lighting panel system simultaneously. An example could be a retail island in combination with highlighting of objects, such as a mannequin.

In an embodiment, the grid structure comprises a height A and a pitch B, and the grid aspect ratio A/B is chosen to fulfill $1<A/B<0.5/\tan(0.5*WBeam)$, where WBeam is the full width at half maximum (FWHM) of the beam of light emitted by the spotlight nodes.

It has been shown that choosing the height A and pitch B such that the grid aspect ratio fulfills the above relation provides for a lighting panel system providing an optimized user experience.

In an embodiment, the grid structure comprises a pitch B which is smaller than 2 cm.

It has been shown that such a size of the pitch is sufficiently small to ensure that the grid structure is not clearly noticeable by a viewer looking at the lighting panel system and thus adds to providing an optimized user experience. Also, making both the pitch B and the height A a bit larger results in a structure that is less prone to sagging under its own weight.

In an embodiment, the grid structure comprises a pitch B and a wall thickness T, and B is at least 5*T.

Thereby, it is ensured that the walls of the grid structure are sufficiently thin compared to the pitch of the grid structure to not intercept too much light.

In an embodiment, the LEDs of the array of LED nodes comprise a pitch C, the luminous lighting panel system comprises a panel depth D and the ratio C/D is chosen to be smaller than or equal to 1.

Such a size interval for the ratio between the pitch of the array of LED nodes and the depth of the panel ensures a good tradeoff between on the one hand that the grid structure is homogeneously illuminated, and on the other hand, in case the lighting panel system is used to show content, such as a picture or movie, on the grid structure, that the resolution of the content shown is not deteriorated. It is noted that in the latter case a ratio $C/D\approx1$ is desirable.

In an embodiment, a sound-absorbing material is provided behind the array of LED nodes with respect to a direction of emission of the light of the array of LED nodes.

In combination with a grid structure as described above, a sound absorbing material located behind the array of LED nodes, and more particularly also behind a substrate or PCB on which the LEDs of the LED nodes are arranged, provides for a lighting panel system that improves the acoustics of an enclosed space such as a room while still not compromising its minimalistic appearance.

In an embodiment, a sound-absorbing material is provided to or on at least a part of a surface of the grid structure.

Thereby, a further improved sound absorbing lighting panel system is provided for while still not compromising its minimalistic appearance In an embodiment, the spotlight nodes are configured to be activatable based on an input received from any one or more of a user, an external sensor, a sensor integrated into the luminous lighting panel system and a camera.

In an embodiment, the spotlight nodes are configured to be activatable such as to only direct light towards objects intended to be highlighted, statically or dynamically based on visitor presence or attention.

Thereby, a lighting panel system is provided which is more energy saving in use.

In an embodiment, a weak diffusing layer is arranged or provided underneath the grid structure, that is on a side of the grid structure opposite to the array of LED nodes. Thereby, the grid structure is hidden further from sight.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
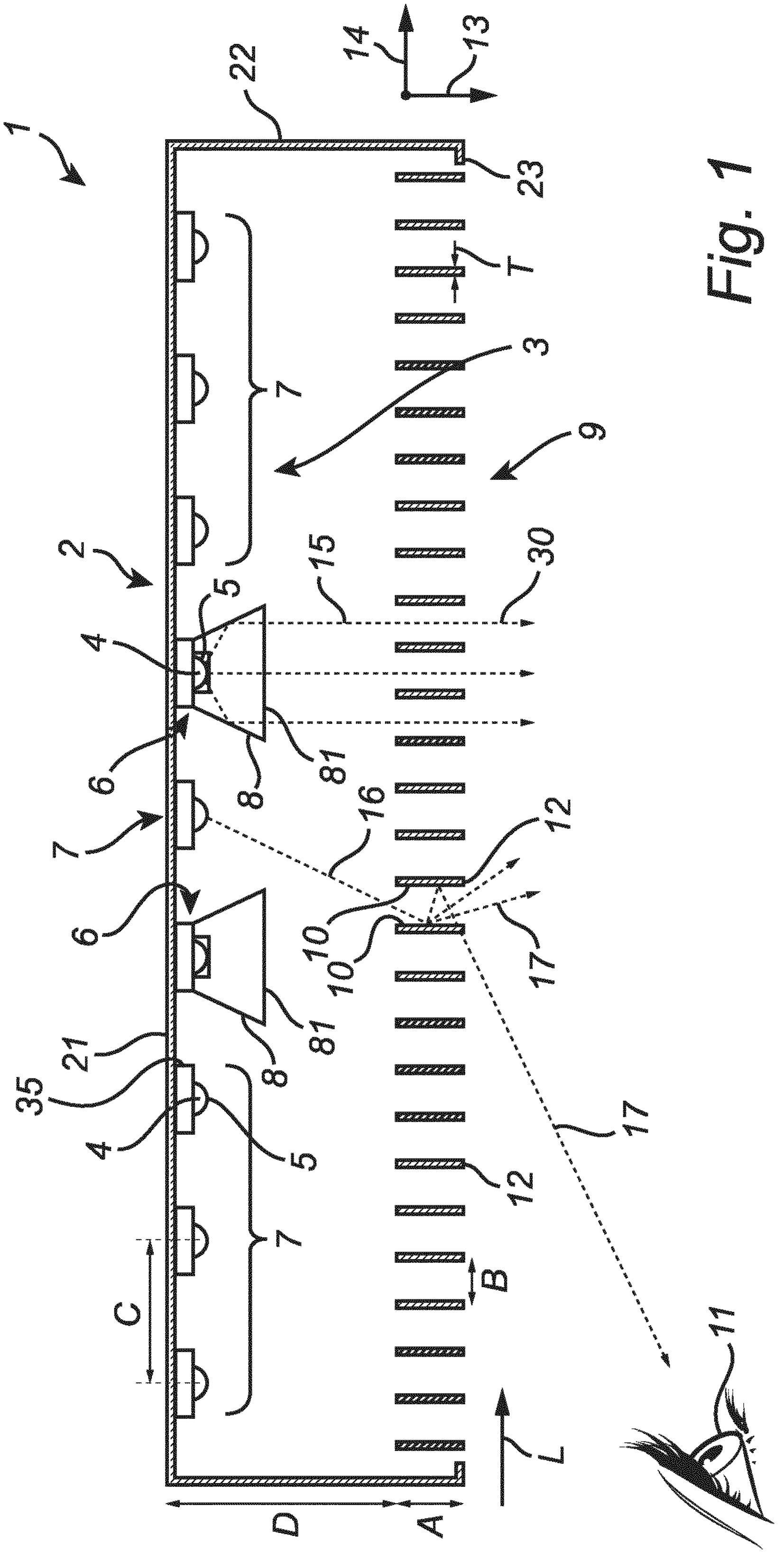
FIG. 1 shows a cross-sectional side view of a lighting panel system according to an embodiment of the invention and comprising a grid structure.

FIG. 1 shows a cross-sectional side view of a lighting panel system 1 according to an embodiment of the invention. The lighting panel system generally and irrespective of the embodiment comprises a luminous panel 2 comprising an array of LED nodes 3 as well as a grid structure 9.

The panel 2 comprises a first wall or surface 21 configured to, in a mounted position of the lighting panel system 1, being arranged extending parallel to and optionally in abutment with a surface on or at which the lighting panel system 1 is mounted. The first surface 21 extends in a first direction 14. The panel 2 further comprises a second wall or surface 22 extending away from to the first surface 21. The second surface 22 is configured to, in a mounted position of the lighting panel system 1, being arranged extending away from a surface on or at which the lighting panel system 1 is mounted. In the embodiment shown the second surface 22 extends in a second direction 13 being perpendicular to the first direction 14. The panel 2 further comprises an opening 23 extending parallel with and opposite to the first surface 21. In the embodiment shown the panel 2 is thus box-shaped.

Generally, and irrespective of the embodiment, each LED node of the array of LED nodes 3 comprises one or more LEDs 4. Each of the one or more LEDs 4 comprises a light exit surface 5. Each of the one or more LEDs 4 is configured to, in operation, emit light 15, 16. The one or more LEDs 4 may be any feasible type of LEDs, such as white LEDs. Each LED node may also comprise three LEDs, being a red a green and a blue LED 4. The LEDs 4 may each be arranged on a substrate or PCB 35.

The LEDs 4 of the array of LED nodes 3 comprise a pitch C. The pitch Cis measured as the center to center distance between adjacent LEDs 4. The lighting panel system 1 comprises a panel depth D. The panel depth D is measured as the shortest distance between the grid structure 9 and the first surface 21. The ratio C/D may be chosen to be smaller than or equal to 1.

Generally, and irrespective of the embodiment, one or more first subsets 6 of the array of LED nodes 3 are spotlight nodes. The spotlight nodes comprise collimating secondary optics 8. In the embodiment shown on FIG. 1, two such first subsets 6 are provided. In the embodiment shown on FIG. 1, the secondary optics 8 each comprise a light exit surface 81 which may extend in parallel with the light exit surface 5 of the LEDs 4. Generally, and irrespective of the embodiment, one or more second subsets 7 of the array of LED nodes 3 are regular LED nodes, which do not comprise collimating secondary optics. In the embodiment shown on FIG. 1, three such second subsets 7 are provided.

In an embodiment, the LED nodes 3 of the one or more second subsets 7 may comprise color (for instance RGB) LEDs 4, to render colored static or dynamic patterns on the panel 2, such as a cloud pattern. The spotlights of the one or more first subsets 6 may take part in creating such patterns, such as providing a sun-like effect.

Generally, and irrespective of the embodiment, the grid structure 9 is arranged in or at the opening 23 of the panel 2. The grid structure 9 is an open grid structure. The grid structure 9 is arranged such that the light 15, 16 emitted by the LEDs 4 of the array of LED nodes 3 traverses the open grid structure 9 and is emitted in a direction generally towards a viewer 11. In this case, the light 15, 16 is in general emitted downward while a fraction of the light will be emitted in the direction of a viewer 11, for example by scattering of light from the grid structure 9 in the direction of the viewer 11.

Generally, and irrespective of the embodiment, the grid structure 9 comprises at least one surface or surface part 10 which may be diffusely reflecting or diffusely transmissive. In case of at least one diffusely reflecting surface or part of a surface, the surface or surface part 10 may be a white surface. The grid structure 9 is further constructed such as to allow one or more pre-defined beam angles of the light 15 emitted by the LEDs 4 of the one or more first subsets 6 of the array of LED nodes, that is the spotlight nodes, to pass the grid structure 9 without being reflected by the grid structure 9 and to be emitted as collimated light 30. The grid structure 9 is also configured and arranged to hide the secondary optics 8 of the one or more first subsets 6 of the array of LED nodes, that is the spotlight nodes, when seen from the point of view of a viewer 11 looking at the lighting panel system 1. Furthermore, a weak diffusing layer may optionally be arranged underneath the grid structure 9. That is, the weak diffusing layer may optionally be arranged on a side of the grid structure 9 opposite to the array of LED nodes 3.

Much of the light 16 emitted by a regular node (second subsets 7 in FIG. 1) is emitted as a relative wide beam of light most of which will be intercepted by the grid structure 9. The light 16 intercepted by the grid structure 9 will be diffusely reflected, some of the diffusely reflected light will be intercepted by the grid structure 9 again, and so on. The result is that most of the light emitted by the regular nodes (second subsets 7 in FIG. 1) will leave the panel 2 as diffuse light 17 with an angular radiation distribution that resembles that of a Lambertian distribution, such as is typical for luminous panels. The light 15 emitted by a spotlight node (first subsets 6 in FIG. 1) on the other hand, is collimated into a relatively narrow beam of light, most of which can pass the grid structure 9 without being intercepted, and thus leave the luminaire as a collimated beam 30.

In the embodiment shown in FIG. 1, the grid structure 9 is a linear grid comprising a plurality of grid elements 12. The grid structure 9 is an open grid structure in the sense that light emitted in an appropriate direction may pass the grid without being affected by the grid elements 12. The grid structure 9 extends in a longitudinal direction L. In the embodiment shown, the longitudinal direction L is parallel with the first direction 14. The plurality of grid elements 12 are aligned along a direction being perpendicular to the light exit surface 5 of each LED 4 of the array of LED nodes 3. The plurality of grid elements 12 may also be described as being aligned along a direction being perpendicular to the longitudinal direction L of the grid structure 9.

The grid structure 9 comprises a height A and a pitch B. In the embodiment shown the grid elements 12 comprises a length being equal to the height A of the grid structure 9. The pitch B is measured as the center to center distance between the grid elements 12 in the longitudinal direction L. The grid aspect ratio A/B may be chosen to fulfill $1<A/B<0.5/\tan$ (0.5*WBeam). WBeam is the full width at half maximum (FWHM) of the beam of light 15 emitted by the one or more first subsets 6 of the array of LED nodes 3, that is the spotlight nodes. For example, in case the spotlight nodes emit a beam of 30 degree FWHM, an optimum ratio A/B would be approximately A/B<0.5/tan (0.5*30)=1.9.

The pitch B may be smaller than 2 cm or even smaller than 1 cm. The grid structure 9 further comprises a wall thickness T. The wall thickness T is measured as the thickness of the grid elements 12. The pitch B may be chosen to be five times the wall thickness T or more than five times the wall thickness T.

Figure 2:
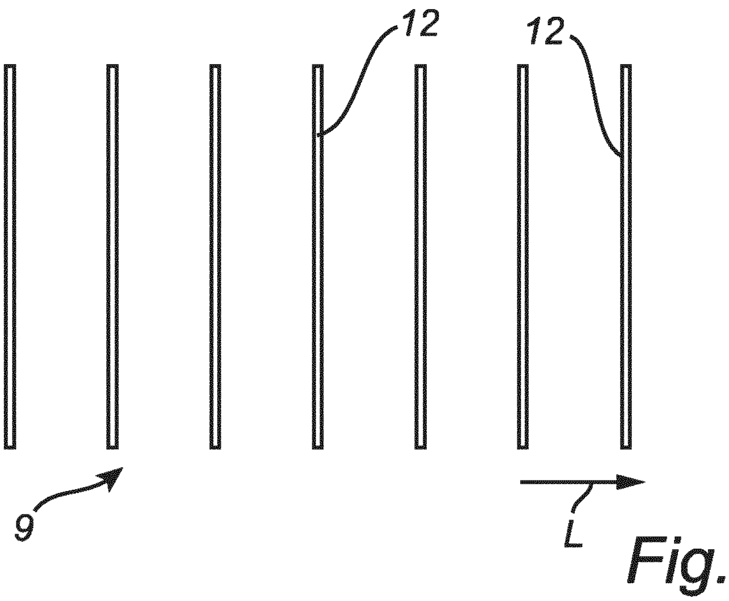
FIGS. 2 and 3 shows top views of two different possible configurations of a grid structure of a lighting panel system according to the invention.
Figure 3:
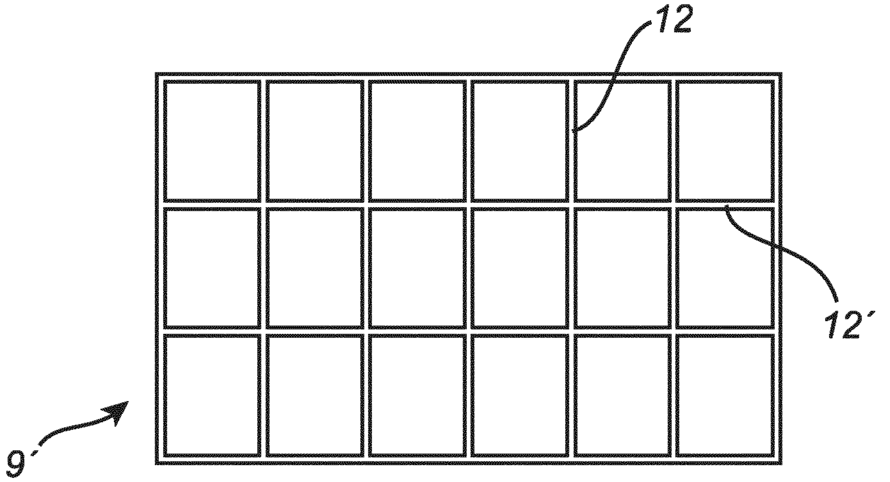
Figure 4:
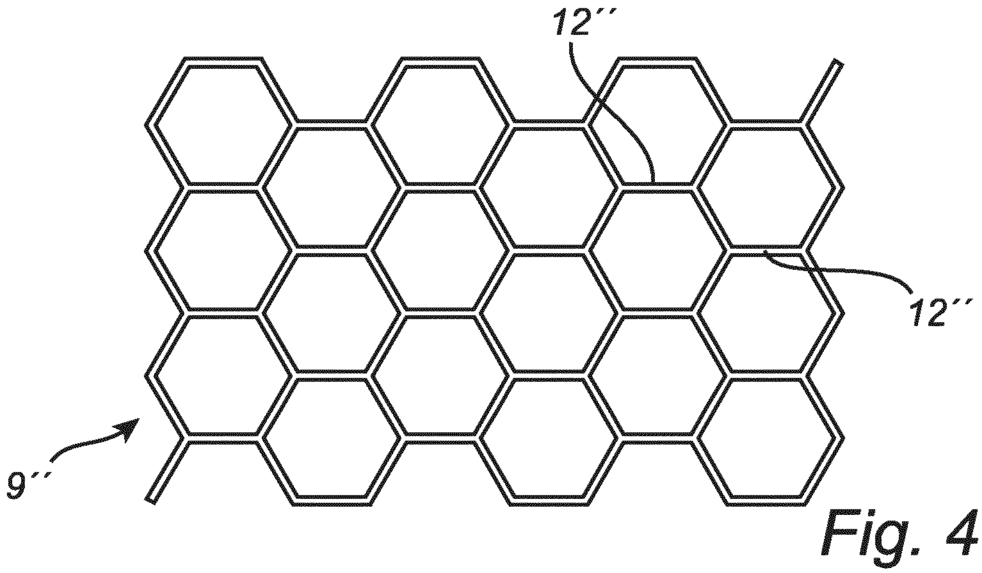
FIG. 4 shows a perspective top view of a further possible configuration of a grid structure of a lighting panel system according to the invention.

Turning now to FIGS. 2-4, examples of possible grid structures for a lighting panel system according to the invention is shown.

FIG. 2 shows a top view of a linear grid structure, such as the grid structure 9, with a number of grid elements 12.

FIG. 3 shows a top view of a 2D grid structure 9' in the form of a square grid with mutually perpendicular grid elements 12 and 12'. Such a grid structure 9' may also be provided as a rectangular grid.

FIG. 4 shows a top view of a 2D grid structure 9" in the form of a hexagonal grid comprising hexagonal grid elements 12".

A further possible grid structure 9, 9', 9" is a quasi-random grid, such as, for example, a grid based on so-called 2D Voronoi tesselation.

Figure 5:
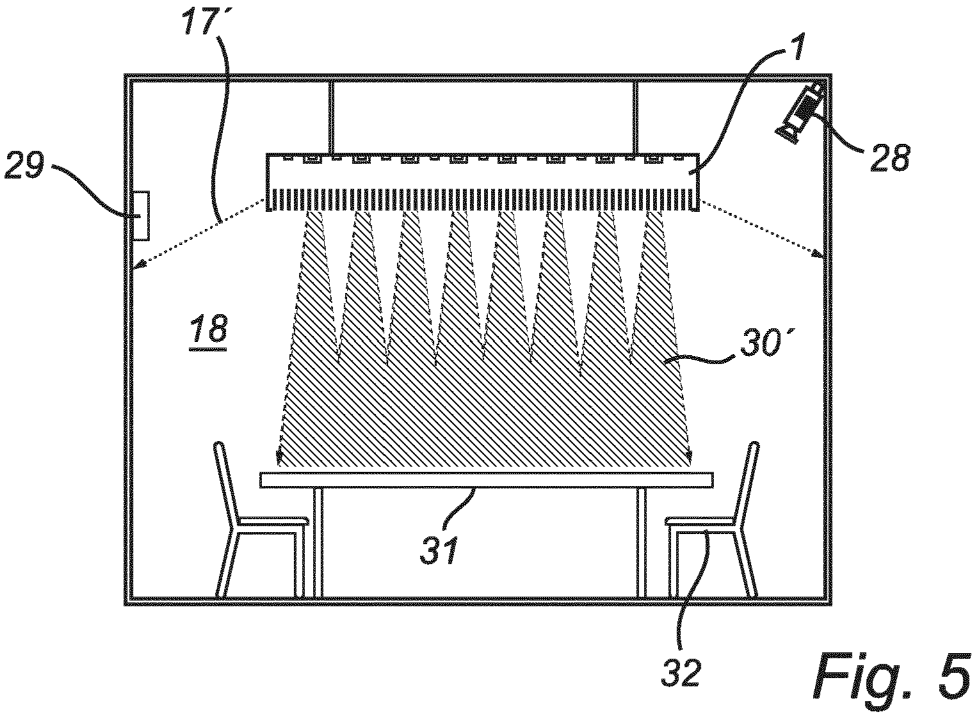
FIG. 5 shows a schematic side view of a lighting panel system according to FIG. 1 in use in a room such as an office or a conference room.

FIG. 5 shows a schematic side view of a lighting panel system 1 according to FIG. 1 in use in a room 18 such as an office or a conference room. With the lighting panel system 1, the effect of a homogeneous illumination 17' of the room 18 and people present in the room 18, in combination with spotlight illumination 30' of objects, such as a conference table 31 or chairs 32, may be obtained.

Figure 6:
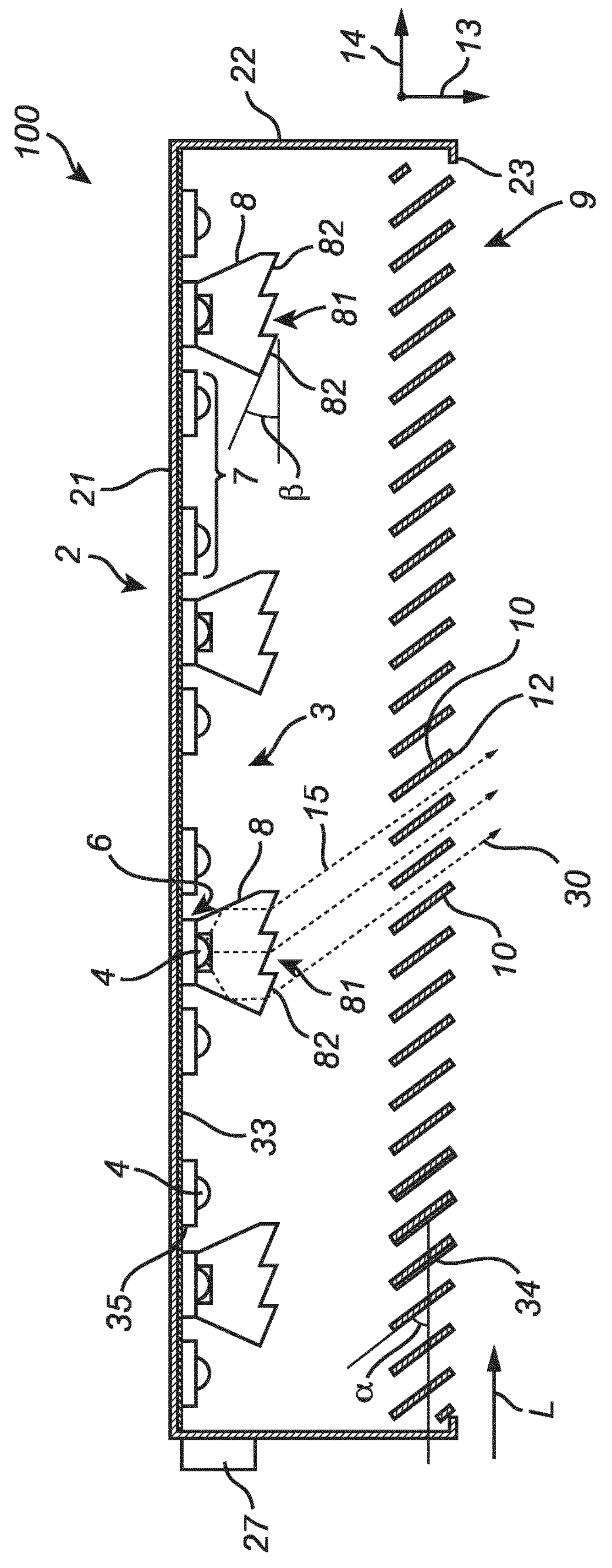
FIG. 6 shows a cross-sectional side view of a lighting panel system according to another embodiment of the invention and comprising a grid structure.

FIG. 6 shows a cross-sectional side view of a lighting panel system 100 according to another embodiment of the invention. The lighting panel system 100 differs from the lighting panel system 1 described above in relation to FIG. 1 in virtue of the following.

The grid structure 9 is a linear grid comprising a plurality of grid elements 12. The grid structure 9 comprises a longitudinal direction L. In the embodiment shown, the longitudinal direction L is parallel with the first direction 14. The plurality of grid elements 12 are in this embodiment slanted. Generally, the plurality of grid elements 12 are aligned along a direction being non-parallel with the light exit surface 5 of each LED 4 of the array of LED nodes 3. The plurality of grid elements 12 may also be described as being aligned along a direction being non-parallel with the longitudinal direction L of the grid structure 9. More particularly, the plurality of grid elements 12 are aligned along a direction extending in an angle, in the embodiment shown on FIG. 6 an angle of about 45 degrees, with the light exit surface 5 of the LEDs 4. The plurality of grid elements 12 may thus also be described as being aligned along a direction extending in an angle, in the embodiment shown on FIG. 6 an angle $\alpha$ of about 45 degrees, with the light exit surface 5 of the LEDs 4.

A sound-absorbing material 33 is provided behind the array of LED nodes 3 with respect to a direction of emission (for instance the direction 13) of the light of the array of LED nodes 3. In other words, the sound-absorbing material 33 on or at a side of the array of LEDs 3 opposite to the light exit surface 5 of each LED 4. Additionally, or alternatively, a sound-absorbing material 34 is provided to or on at least a part of a surface of the grid structure 9.

The secondary optics 8 each comprise a light exit surface 81 comprising a plurality of slanted segments 82 extending in an angle $\beta$ with the light exit surface 5 of the LEDs 4. The angle $\beta$ is chosen such that the resulting main beam angle of the light 15 emitted by the spotlight node (that is first subset 6) corresponds to the slant angle $\alpha$ of the grid elements 12 located close to where the light 15 crosses the grid structure 9.

A variant embodiment of the lighting panel system 100 according to the invention can be envisaged. In this variant, different spotlight nodes (that is first subsets 6) are configured to emit light 15 with different beam angles. This may be obtained by the secondary optics 8 each comprising a light exit surface 81 comprising a plurality of slanted segments 82, where the plurality of slanted segments 82 for different secondary optics 8 extend in different angles $\beta$ with the light exit surface 5 of the LEDs 4. In this variant, the grid elements 12 of the grid structure 9 are further provided with a slant angle $\alpha$ which vary across the grid structure 9, in the longitudinal direction L of the grid structure 9 such that at any given point along the longitudinal direction L of the grid structure 9, the angle $\alpha$ and the angle $\beta$ of the plurality of slanted segments 82 of a secondary optics 8 correspond to one another.

For instance, the slanted grid elements 12 could gradually change orientation and thus slant angle $\alpha$, for instance such that the grid elements 12 are completely vertical in the panel center while gradually increasing the slant angle towards the panel periphery.

Figure 7:
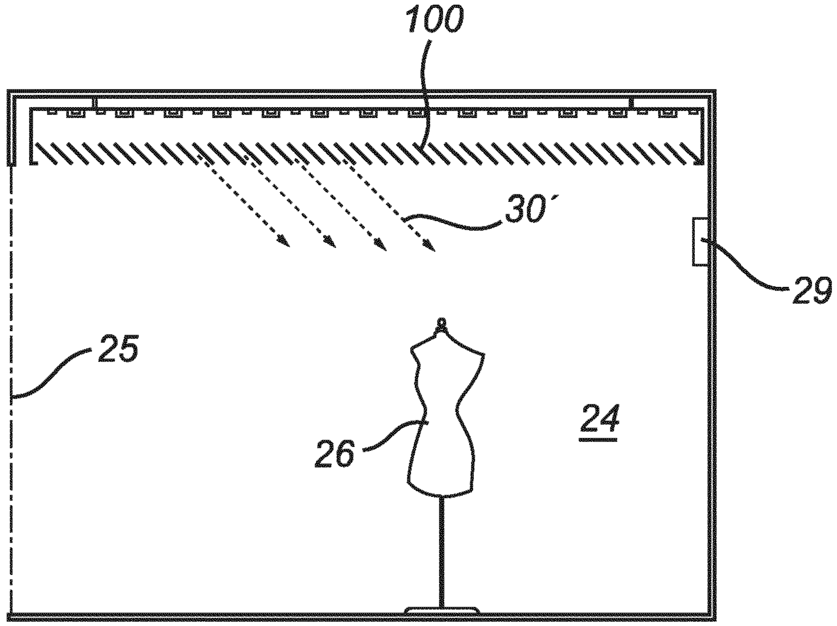
FIG. 7 shows a schematic side view of a lighting panel system according to FIG. 6 in use in a room such as a shop.

FIG. 7 shows a schematic side view of a lighting panel system 100 according to FIG. 6, or the above-described variant embodiment of a lighting panel system 100 according to FIG. 6, in use in a room 24, such as shop or a store. The room 24 comprises a window 25, for instance towards a street, through which by-passers may look into the room 24. With the lighting panel system 100 the effect of a homogeneous soft illumination of a retail island, such as the entirety of a display shown in the window 25, in combination with highlighting of an objects, such as a mannequin 26, may be obtained.

For all embodiments of a lighting panel systems 1, 100 according to the invention, when controlling the LED nodes of the array of LED nodes 3, the regular LED nodes (second subsets 7) and the spotlight nodes (first subsets 6) may be addressed as a whole or separately. The spotlight nodes (first subsets 6) may be addressed as a whole, in groups, or individually.

Spotlight nodes (first subsets 6) may be activated based on input from any one or more of a user, a sensor 27, 29 and a camera 28 (FIG. 5). The aim may for instance be to only direct light towards objects that it is desired to highlight. The sensor input may be received from an external sensor 29 (FIGS. 5 and 7), or it may be received from one or more sensor(s) 27 (FIG. 6) integrated into the lighting panel system 1, 100. The sensor 27 may for instance be a sensor 27 arranged on the panel 2 (cf. FIG. 6) or the sensor 27 may be an array of distance sensors integrated into a substrate or PCB carrying the array of LEDs 3.

Referring to the use situation shown in FIG. 7, the sensor 29 may for instance be a presence or motion sensor able to detect presence at the table 20. The directional light (spotlight nodes or first subsets 6) may then be activated based on the presence detected. The sensor may also be a motion sensor able to detect both motion in the room 18 and motion at the table 20. The regular LED nodes (second subsets 7) or spotlight LED nodes (first subsets 6) may then be activated on the presence detected both in the room 18 and at the table 20.

In the case user input is provided, a user interface, such as a lighting control app on a smartphone, may be provided enabling the user to control both the regular LED nodes (second subsets 7) and the spotlight LED nodes (first subsets 6), for instance using a balance slider, or two separate sliders provided in the app. In case of lighting panel systems 1, 100 with multiple activatable spotlight LED nodes (first subsets 6) the app may be configured to enable the user to select those spotlight LED nodes individually to activate or deactivate them or to adjust individual spotlight intensity.

In addition to digital activation of LED nodes, the lighting panel system 1, 100 may also be configured such as to enable an end-user to open the luminous panel 2 and to add or remove spotlight LED nodes (first subsets 6) to or from the system. For instance, in the case that the regular LED nodes (second subsets 7) and the spotlight LED nodes (first subsets 6) comprise the same LEDs, the user may simply add a collimating optical element 8, for instance by using a click-on mechanism, to a regular LED node and thereby turn it into a spotlight LED node.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A lighting panel system comprising:

a luminous panel comprising an array of LED nodes, each LED node of the array of LED nodes comprising one or more LEDs, each of the one or more LEDs comprising a light exit surface and being configured to, in operation, emit light, one or more first subsets of the array of LED nodes being spotlight nodes comprising collimating secondary optics, and one or more second subsets of the array of LED nodes being regular LED nodes not comprising collimating secondary optics, and a grid structure arranged such that the light emitted by the LEDs of the array of LED nodes traverses the grid structure, wherein the grid structure comprises at least one of a diffusely reflecting and a diffusely transmissive surface part, the grid structure is constructed such as to allow one or more pre-defined beam angles of light emitted by the LEDs of the spotlight nodes to pass without being reflected by the grid structure, the grid structure is configured and arranged to hide the collimating secondary optics of the spotlight nodes when seen from the point of view of a viewer looking at the lighting panel system, and wherein the grid structure is a linear grid comprising a plurality of grid elements, and wherein the plurality of grid elements are aligned along a direction being any one of not parallel with and perpendicular to the light exit surface of each LED of the array of LED nodes.

2. A luminous lighting panel system according to claim 1, wherein the grid structure is a 2D grid.

3. A luminous lighting panel system according to claim 2, wherein the 2D grid is any one of a square grid, a rectangular grid, a hexagonal grid and a quasi-random grid.

4. A luminous lighting panel system according to claim 1, wherein the layout of the grid structure is chosen in dependence of one or more of at least one anticipated prevailing viewer position and at least one anticipated prevailing direction of view relative to the array of LED nodes.

5. A luminous lighting panel system according to claim 1, wherein the plurality of grid elements are aligned:

to be mutually parallel, or to gradually change orientation along a longitudinal direction L of the grid structure.

6. A luminous lighting panel system according to claim 1, wherein the grid structure comprises a height A and a pitch B, and wherein the grid aspect ratio A/B is chosen to fulfill $1<A/B<0.5/\tan$, wherein WBeam is the full width at half maximum of the beam of light emitted by the spotlight nodes.

7. A luminous lighting panel system according to claim 1, wherein the grid structure comprises a pitch B, and wherein B is smaller than 2 cm.

8. A luminous lighting panel system according to claim 1, wherein the grid structure comprises a pitch B and a wall thickness T, and wherein B is at least 5*T.

9. A luminous lighting panel system according to claim 1, wherein the LEDs of the array of LED nodes comprise a pitch C, wherein the luminous lighting panel system comprises a panel depth D and wherein the ratio C/D is chosen to be smaller than or equal to 1.

10. A luminous lighting panel system according to claim 1, wherein a sound-absorbing material is provided behind the array of LED nodes with respect to a direction of emission of the light of the array of LED nodes.

11. A luminous lighting panel system according to claim 1, wherein a sound-absorbing material is provided to or on at least a part of a surface of the grid structure.

12. A luminous lighting panel system according to claim 1, wherein the spotlight nodes are configured to be activatable based on an input received from any one or more of a user, an external sensor, a sensor integrated into the luminous lighting panel system and a camera.

13. A luminous lighting panel system according to claim 1, wherein the spotlight nodes are configured to be activatable such as to only direct light towards objects intended to be highlighted, statically or dynamically based on visitor presence or attention.

14. A luminous lighting panel system according to claim 1, wherein a diffusing layer is provided on a side of the grid structure opposite to the array of LED nodes.

* * * * *